US008121720B2

(12) United States Patent
Tsai (10) Patent No.: US 8,121,720 B2
(45) Date of Patent: Feb. 21, 2012

(54) TOOL-PATH CALCULATION APPARATUS FOR NUMERICAL CONTROLLED SYSTEM AND METHOD FOR OPERATING THE SAME

(75) Inventor: Ching-Shiong Tsai, Taoyuan County (TW)

(73) Assignee: Delta Electronics, Inc., Taoyuan Shien (TW)

( * ) Notice: Subject to any disclaimer, the term of this patent is extended or adjusted under 35 U.S.C. 154(b) by 329 days.

(21) Appl. No.: 12/580,374

(22) Filed: Oct. 16, 2009

(65) Prior Publication Data

US 2011/0093114 A1    Apr. 21, 2011

(51) Int. Cl.
*G06F 19/00* (2006.01)
*G06F 7/38* (2006.01)

(52) U.S. Cl. ........ 700/193; 700/160; 700/182; 700/184; 700/190; 700/192; 708/290; 708/442

(58) Field of Classification Search .................. 700/160, 700/182, 184, 190–194; 708/290, 442
See application file for complete search history.

(56) References Cited

U.S. PATENT DOCUMENTS

| 4,531,182 | A | * | 7/1985 | Hyatt | 700/2 |
|---|---|---|---|---|---|
| 5,005,135 | A | * | 4/1991 | Morser et al. | 700/193 |
| 6,317,646 | B1 | * | 11/2001 | de Caussin et al. | 700/173 |
| 6,741,905 | B1 | * | 5/2004 | Fishman et al. | 700/180 |
| 6,772,020 | B2 | * | 8/2004 | Kohler et al. | 700/73 |
| 7,496,528 | B2 | * | 2/2009 | Lukis et al. | 705/26.4 |
| 7,840,443 | B2 | * | 11/2010 | Lukis et al. | 705/26.4 |
| 2007/0038531 | A1 | * | 2/2007 | Lukis et al. | 705/26 |
| 2009/0125418 | A1 | * | 5/2009 | Lukis et al. | 705/26 |
| 2009/0228138 | A1 | * | 9/2009 | Otsuki et al. | 700/187 |
| 2010/0131081 | A1 | * | 5/2010 | Brown et al. | 700/21 |
| 2010/0211234 | A1 | * | 8/2010 | Tsai et al. | 700/302 |

\* cited by examiner

*Primary Examiner* — Ramesh Patel
(74) *Attorney, Agent, or Firm* — Muncy, Geissler, Olds & Lowe, PLLC (57) ABSTRACT

A tool-path calculation apparatus for a numerical controlled system and a method for operating the same are applied to a CNC tool machine. The tool-path calculation apparatus includes an upper controller and a servo driver. Firstly, an interpreter is provided to interpret the tool paths to produce a plurality of executable instructions. Afterward, the executable instructions are sent from the upper controller to the servo driver through a serial communication interface and stored in a queue buffer. Finally, the executable instructions are received and calculated by a tool path calculator to produce a plurality of points along the tool paths.

11 Claims, 6 Drawing Sheets

TOOL-PATH CALCULATION APPARATUS FOR NUMERICAL CONTROLLED SYSTEM AND METHOD FOR OPERATING THE SAME

BACKGROUND OF THE INVENTION

1. Field of the Invention

The present invention relates to a tool-path calculation apparatus for a numerical controlled system and a method for operating the same, and more particularly to the tool-path calculation apparatus with a queue buffer for a numerical controlled system and a method for operating the same.

2. Description of Prior Art

Motion control is the core technique in the precision machining tools, and applications of the motion control includes industrial machines for a position control or a velocity control, and further includes computerized numerical control (CNC) machine tools for a high-precision control. A motion control system is integrated with various software and hardware techniques, so cost, stability, use frequency, maintaining service of the motion control system and even scalability and interoperability of the software and the hardware are important factors for evaluating the motion control system. Furthermore, both position and velocity of all spindles of the machine tool are practically taken into account to determine controlling quality of the machine tool.

The tool paths are defined by a G-code file which is produced through a computer-aided manufacturing (CAM) software. Also, the G-code file is a part of the NC-programming that controls NC and CNC machine tools.

The CNC machine tools mean that the computerized numerical control system is installed in the machine tool, and the computerized numerical control system receives and calculates inputted data and afterward sends commands to control operating conditions, such as spindle rotation, cutting tool replacement, cutting motion, coolant switch, or so on, to achieve expected control.

U.S. Pat. No. 6,772,020 disclosed an arrangement for generating command variables for control loops of a numerically controlled machine that includes an interpolator unit for providing position set points with a defined interpolator scanning rate and a precision interpolator unit. The precision interpolator unit includes a scanning rate converter and a downstream-connected low-pass filter, wherein the precision interpolator unit is arranged downstream of the interpolator unit, which generates command variables at an output side from position set points at an input side for one or several downstream-connected control loops, wherein the precision interpolator unit generates command variables in a time pattern of the control loops with a control loop scanning rate. The command variables for the control loops are implemented to adopt a structure of a two-order filter, and the filter is also designed to match the numerically controlled machine. However, it does not render a higher-order differentiability for resultant path curves. The practicability of the numerically controlled machine is reduced due to high complexity of the command-generating arrangement.

Hence, a tool-path calculation apparatus for a numerical controlled system and a method for operating the same are disclosed to reduce the amount of the sent data and reduce path error.

SUMMARY OF THE INVENTION

In order to solve the above-mentioned problems, the present invention provides a tool-path calculation apparatus. The tool-path calculation apparatus is applied to a CNC tool machine. The tool paths are defined by a G-code file which is produced through a computer-aided manufacturing (CAM) software. The tool-path calculation apparatus includes an upper controller and a servo driver.

The upper controller includes an interpreter and a first high-speed serial communication interface. The interpreter reads the G-code file and interprets the G-code file to produce a plurality of executable instructions. The first high-speed serial communication interface is connected to the interpreter to provide an interface for sending the executable instructions.

The servo driver includes a second high-speed serial communication interface, a queue buffer, and a tool path calculator. The second high-speed serial communication interface is connected to the first high-speed serial communication interface of the upper controller to electrically connect the servo driver and the upper controller and to provide an interface for receiving the executable instructions. The queue buffer is connected to the second high-speed serial communication interface to store the executable instructions, which are sent from the upper controller, to the servo driver. The tool path calculator is connected to the queue buffer to receive and calculate the executable instructions to produce a plurality of points along the tool paths.

In order to solve the above-mentioned problems, the present invention provides a method of calculating tool paths for a numerical controlled system. The numerical controlled system is applied to an upper controller to provide a plurality of executable instructions to a servo driver to calculate tool paths of a CNC tool machine. The method includes the following steps: Firstly, a G-code file is read. Afterward, the G-code file is interpreted through an interpreter to produce the executable instructions. Afterward, the executable instructions are sent and stored sequentially to a queue buffer. Afterward, the executable instructions are sent sequentially to tool paths calculator. Finally, the executable instructions are calculated into a plurality of points along the tool paths through the tool path calculator.

Accordingly, the tool-path calculation apparatus for a numerical controlled system and a method for operating the same are applied to substantially reduce the amount of the sent data from the upper controller to the servo driver. Also, the executable instructions can be calculated to produce a plurality of points along the tool paths without using a conventional command recovery, thus reducing path error. Furthermore, the calculation of position, angular velocity, and angular acceleration of the tool paths are synchronous to the position commands between the servo driver and the upper controller to substantially increase dynamic response of the system. In addition, due to the low amount of the sent data, the upper controller can be requested to re-send the executable instructions to increase system robustness when the received executable instructions are not correct.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
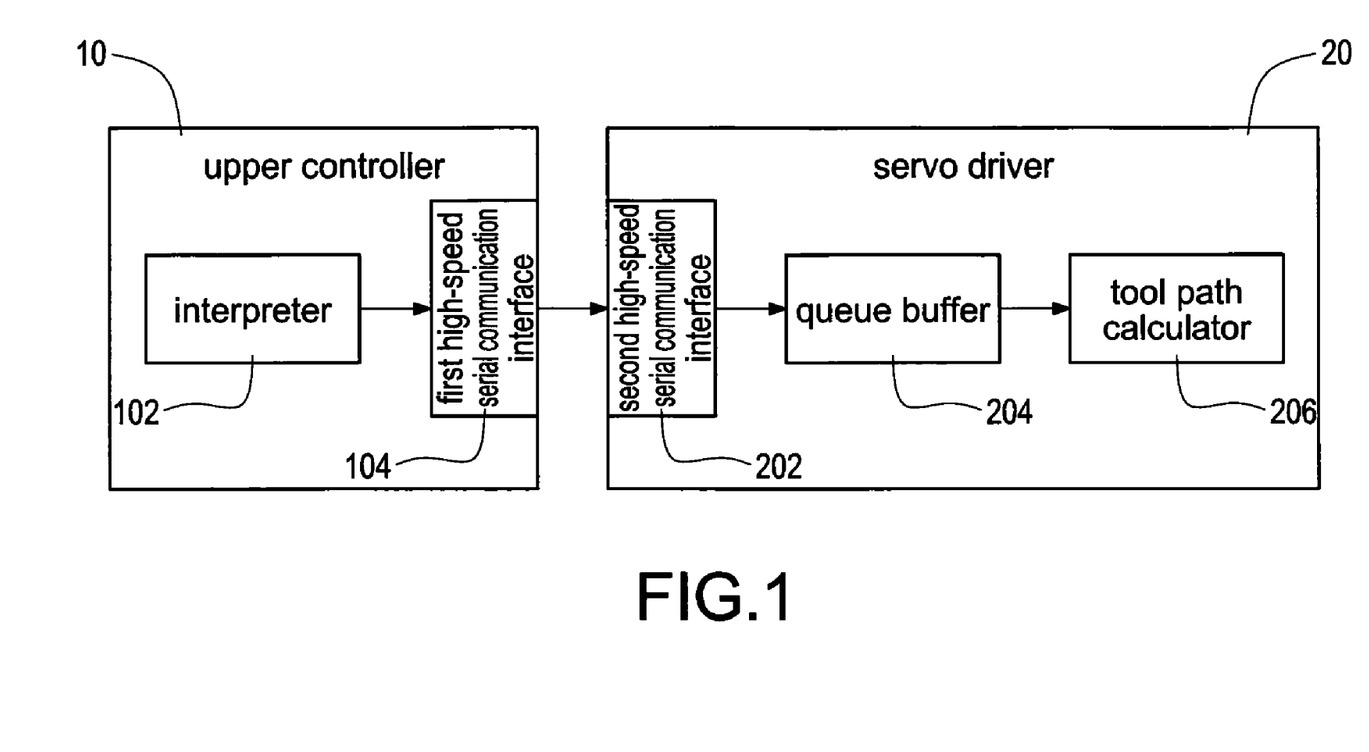
FIG. 1 is schematic view of communicating between an upper controller and a servo driver according to the present invention.

Reference will now be made to the drawing figures to describe the present invention in detail. Reference is made to FIG. 1 which is schematic view of communicating between an upper controller and a servo driver according to the present invention. The tool-path calculation apparatus is applied to a CNC tool machine. The tool paths are defined by a G-code file which is produced through a computer-aided manufacturing (CAM) software. The tool-path calculation apparatus includes an upper controller and a servo driver. The tool-path calculation apparatus includes an upper controller 10 and a servo driver 20. The upper controller 10 includes an interpreter 102 and a first high-speed serial communication interface 104. Also, the servo driver 20 includes a second high-speed serial communication interface 202, a queue buffer 204, and a tool path calculator 206.

The interpreter 102 reads the G-code file and interprets the G-code file to produce a plurality of executable instructions. The first high-speed serial communication interface 104 is connected to the interpreter 102 to provide an interface for sending the executable instructions. The second high-speed serial communication interface 202 is connected to the first high-speed serial communication interface 104 of the upper controller 10 to electrically connect the servo driver 20 and the upper controller 10, and to provide an interface for receiving the executable instructions. The queue buffer 204 is connected to the second high-speed serial communication interface 202 to store the executable instructions, which are sent from the upper controller 10, to the servo driver 20. The tool path calculator 206 is connected to the queue buffer 204 to receive and calculate the executable instructions to produce a plurality of points along the tool paths.

G-Code, or preparatory function code, are functions in the numerical control programming language. The preparatory function codes include about 100 programming instructions, namely G00 command through G99 command. More particularly, G00 command (rapid positioning), G01 command (linear interpolation), G02 command (CW circular interpolation), and G03 command (CCW circular interpolation) are in common use. In addition, most of the other G-code commands are control command to the CNC tool machine.

Figure 2:
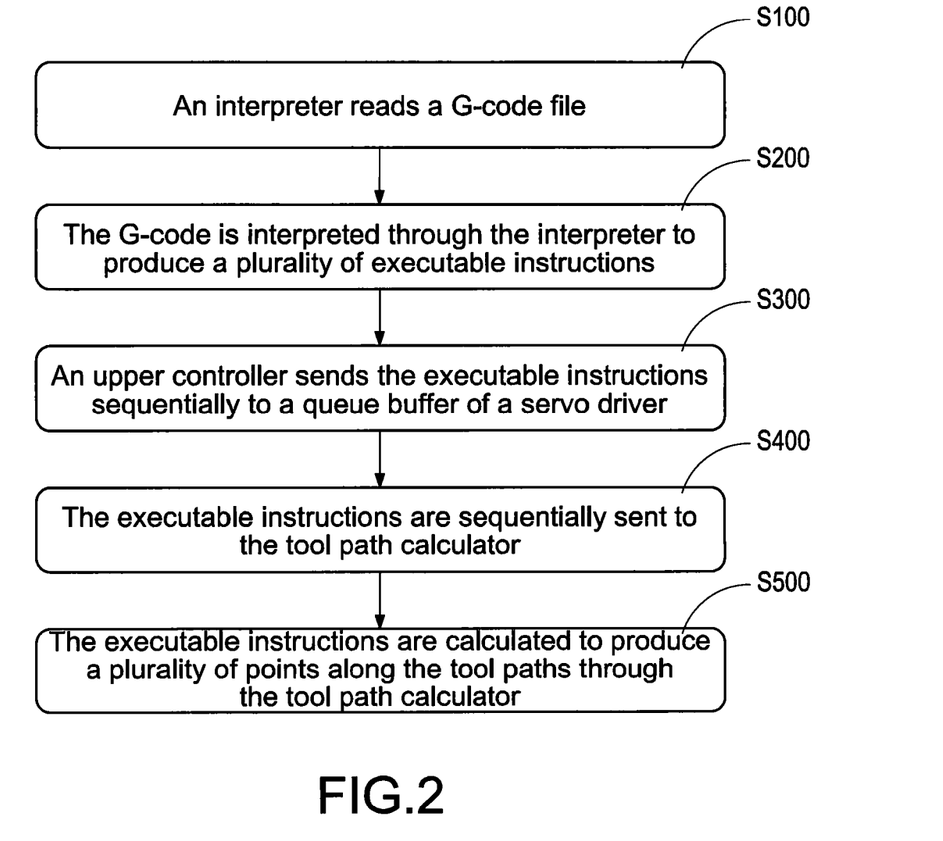
FIG. 2 is a flowchart of a method of calculating tool paths.

Reference is made to FIG. 2 which is a flowchart of a method of calculating tool paths. The detailed description is as follows. Firstly, an interpreter reads a G-code file (S100). The G-code is interpreted through the interpreter to produce a plurality of executable instructions (S200). Namely, the interpreter can provide optimal velocity, corner, and curve fitting to output the most appropriate instructions when the G-code are read into the interpreter. Afterward, an upper controller sends the executable instructions sequentially to a queue buffer of a servo driver (S300). The executable instructions are stored sequentially to the queue buffer when the servo driver receives the executable instructions. (The detailed description will be made hereinafter with reference to FIG. 3) Afterward, when the executable instructions, which are stored in the queue buffer, are read by a tool path calculator, the executable instructions are sequentially sent to the tool path calculator (S400). Afterward, the executable instructions are calculated to produce a plurality of points along the tool paths through the tool path calculator (S500). Hence, the G-code file is interpreted through the interpreter to produce the executable instructions. Also, the executable instructions are directly sent through serial communication interfaces and the executable instructions are calculated to produce a plurality of points along the tool paths through the tool path calculator.

Figure 3:
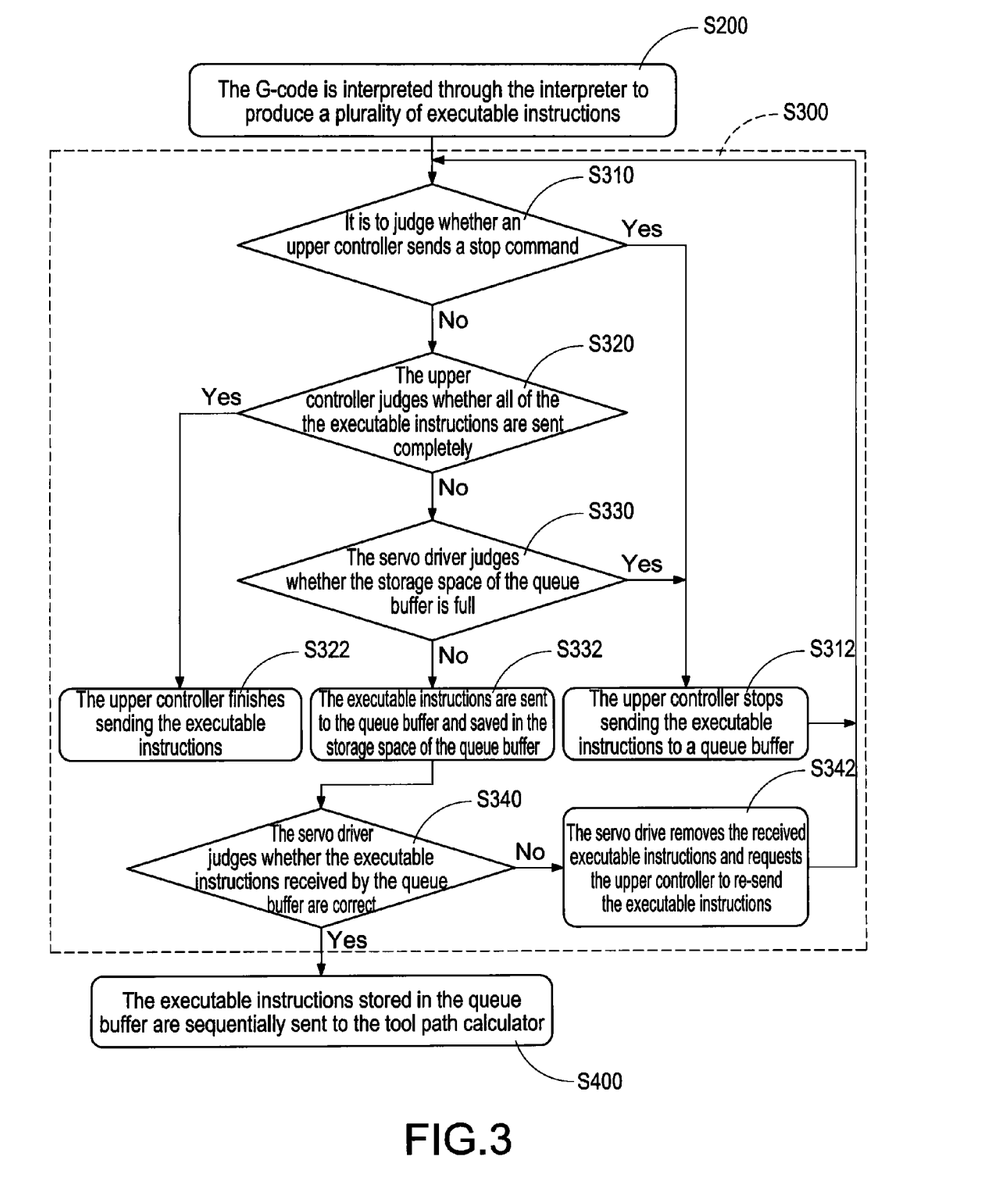
FIG. 3 is a flowchart of storing a plurality of executable instructions in a queue buffer.

Reference is made to FIG. 3 which is a flowchart of storing a plurality of executable instructions in a queue buffer. It is to judge whether an upper controller sends a stop command (S310) to assure that the upper controller continues sending the executable instructions or stops sending the executable instructions after the executable instructions are produced by the interpreter (S200). The upper controller stops sending the executable instructions to a queue buffer (S312) when the upper controller sends the stop command. Namely, in case of emergency, the upper controller provides an emergent request to stop sending the executable instructions to the servo driver to interrupt the operation of the servo driver. The upper controller judges whether all of the executable instructions are sent completely (S320) when the upper controller does not send the stop command. The upper controller finishes sending the executable instructions (S322) when all of the executable instructions are sent. The servo driver judges whether the storage space of the queue buffer is full (S330) when all of the executable instructions are not sent. The executable instructions are stopped sending to the queue buffer (S312) when the storage space of the queue buffer is full. Namely, the servo driver instructs the upper controller to stop sending the executable instructions when the storage space of the queue buffer is full. The executable instructions are sent to the queue buffer and saved in the storage space of the queue buffer (S332) when the storage space of the queue buffer is not full. Namely, the servo driver instructs the upper controller to continue sending the executable instructions to the queue buffer when the storage space of the queue buffer is not full. After the step (S332), the servo driver judges whether the executable instructions received by the queue buffer are correct (S340) to assure that the executable instructions, which are sent from the upper controller to the servo driver, are correct. The servo drive removes the received executable instructions and requests the upper controller to re-send the executable instructions (S342) when the received executable instructions are not correct. The step (S400) is executed when the received executable instructions are correct. Namely, the executable instructions stored in the queue buffer are sequentially sent to the tool path calculator (S400).

In addition, the step (S310) is re-executed after the step (S312). Namely, it is to judge whether the upper controller sends the stop command (S310) after the executable instructions are stopped sending to the queue buffer by the upper controller (S312). In addition, the step (S310) is re-executed after the step (S342). Namely, it is to judge whether the upper controller sends the stop command (S310) after the servo drive removes the received executable instructions and requests the upper controller to re-send the executable instructions (S342). More particularly, the above-mentioned steps are repeated after the step (S310), the detailed description is omitted here for conciseness.

Figure 4:
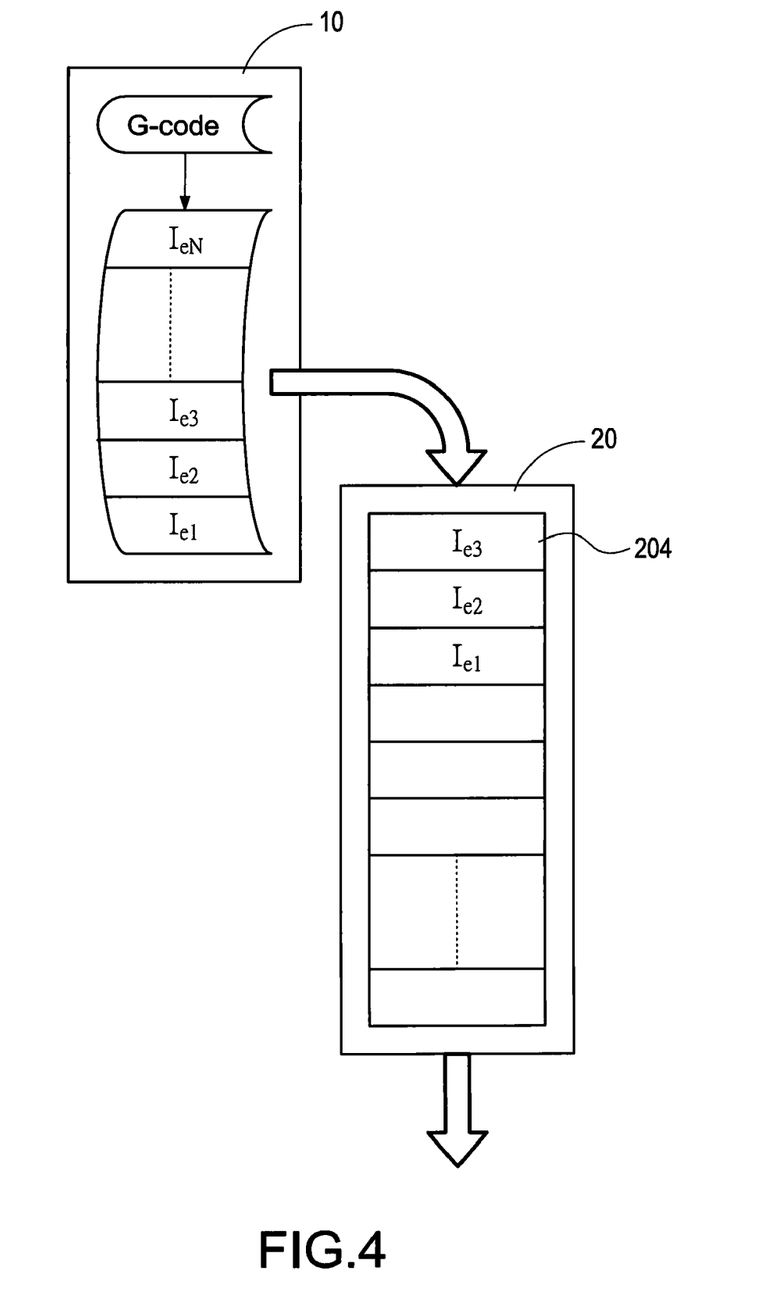
FIG. 4 is a schematic view of storing the executable instructions in the queue buffer.

Reference is made to FIG. 4, which is a schematic view of storing the executable instructions in the queue buffer. A queue is a particular kind of collection in which the entities in the collection are kept in order. Also, the principal operations on the collection are the addition of entities to the rear terminal position and removal of entities from the front terminal position. Accordingly, this makes the queue a First-In-First-Out data structure. In the present invention, the servo driver 20 provides a queue buffer 204 to store the executable instructions $I_{e1}$, $I_{e2}$, $I_{e3}$, . . . , $I_{eN}$ which are sent from the upper controller 10 to the servo driver 20. The executable instructions $I_{e1}$, $I_{e2}$, $I_{e3}$, . . . , $I_{eN}$ are sequentially sent from the upper controller 10 to the servo driver 20 and sequentially stored in the storage space of the queue buffer 204 of the servo driver 20. In the figure, the arrow direction indicates the data access direction of the executable instructions $I_{e1}$, $I_{e2}$, $I_{e3}$, . . . , $I_{eN}$. As shown in FIG. 4, the G-code file is produced by the computer aided manufacturing to define the tool paths which applied to the CNC tool machine. The G-code file is read by an interpreter of the upper controller 10 (shown in FIG. 1), and the G-code file is interpreted by the interpreter to produce a plurality of executable instructions $I_{e1}$, $I_{e2}$, $I_{e3}$, . . . , $I_{eN}$. The upper controller 10 has a first high-speed serial communication interface 104 (as shown in FIG. 1), and the servo driver 20 has a second high-speed serial communication interface 202 (as shown in FIG. 1). The first high-speed serial communication interface 104 and the second high-speed serial communication interface 202 provide an interface for sending and receiving the executable instructions $I_{e1}$, $I_{e2}$, $I_{e3}$, . . . , $I_{eN}$, respectively. In this embodiment, the servo driver 20 instructs the upper controller 10 to continue sending the executable instructions $I_{e1}$, $I_{e2}$, $I_{e3}$, . . . , $I_{eN}$ when the storage space of the queue 204 is not full. Hence, the executable instructions $I_{e1}$, $I_{e2}$, $I_{e3}$, . . . , $I_{eN}$ are sequentially stored in the storage space of the queue buffer 204. In addition, the servo driver 20 sequentially sends the executable instructions $I_{e1}$, $I_{e2}$, $I_{e3}$, . . . , $I_{eN}$ to a tooth path calculator 206 in FIFO order when the tooth path calculator 206 (as shown in FIG. 1) of the servo driver 20 reads the executable instructions $I_{e1}$, $I_{e2}$, $I_{e3}$, . . . , $I_{eN}$ stored in the storage space of the queue buffer 204.

Figure 5A:
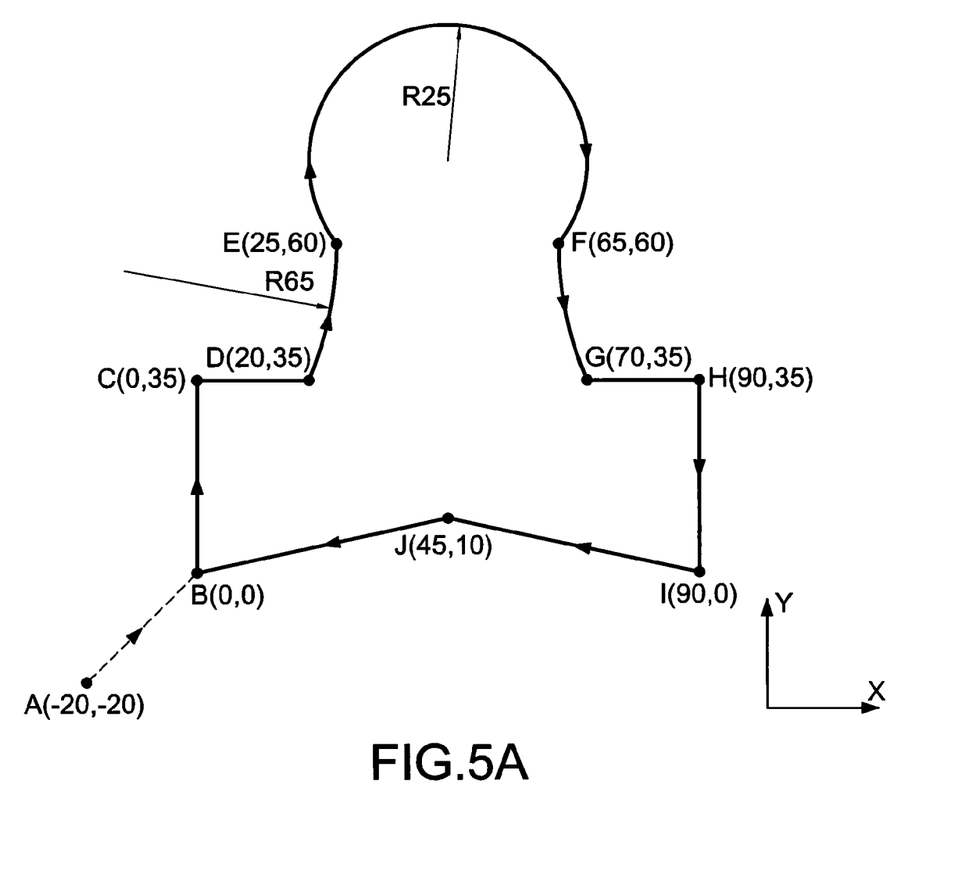
FIG. 5A is an exemplary view of the tool paths which are applied to a CNC tool machine.
Figure 5B:
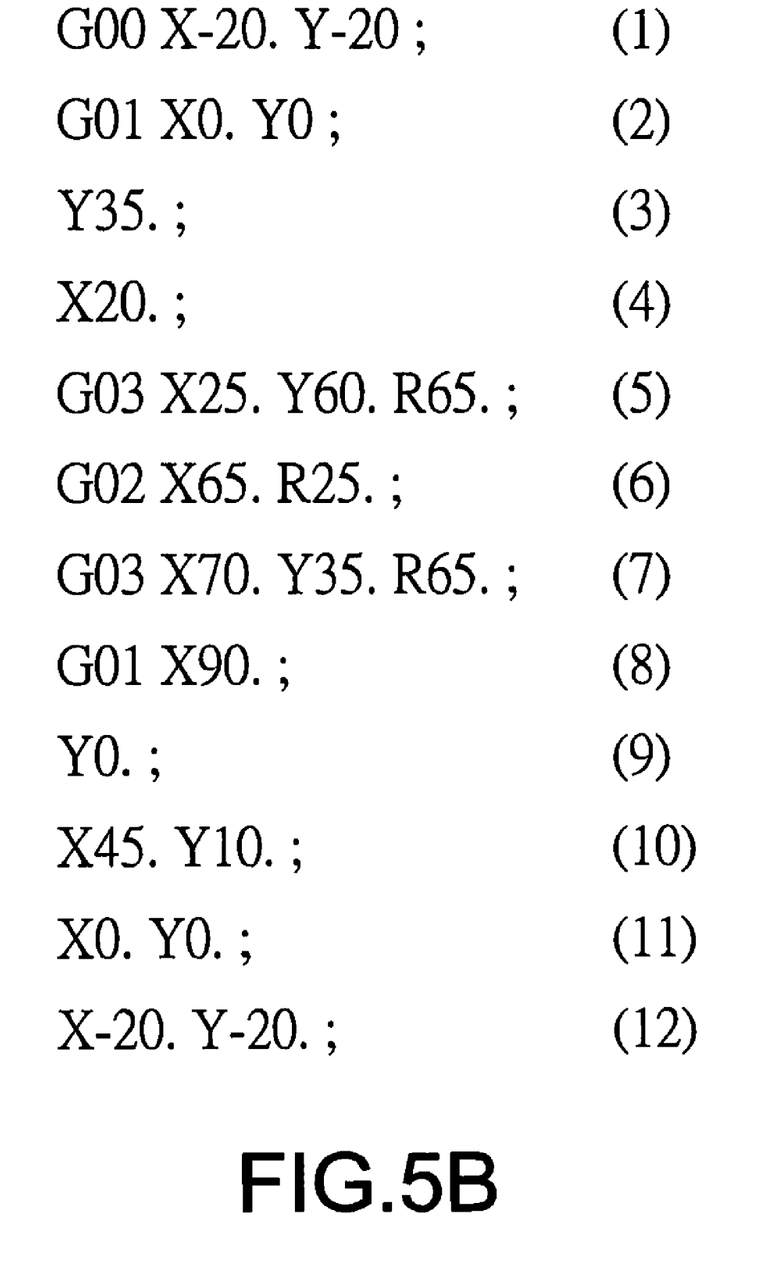
FIG. 5B is a list of executable instructions to the FIG. 5A.

Reference is made to FIG. 5A and FIG. 5B which are an exemplified view of the tool paths which are applied to a CNC tool machine and a list of executable instructions to the FIG. 5A. In this embodiment, it mainly explains that the G-code programming commands are used to calculate tool paths for the CNC tool machines. Hence, the detailed description of the tool compensation commands and other control commands. The tool compensation commands include G40 command (cutter compensation cancel), G41 command (cutter compensation left), and G42 command (cutter compensation right). Because each tool has small cutting radius, the cutting pint depends of direction of the tool movement. The G41 command is used when the cutter is on the left of the programmed path (looking in the direction of the tool movement), and the G42 command is used when the cutter is on the right of the programmed path (looking in the direction of the tool movement).

The G00 command, G01 command, G02 command, and G03 command are in common use. More particularly, the G00 command is a rapid positioning command, the G01 command is a linear interpolation, the G02 command is a CW circular interpolation command, and the G03 is a CCW circular interpolation command. In FIG. 5B, the tool rapidly moves to a point A (−20, −20) when the G-code command in the first row is executed. The tool linearly interpolates from the point A (−20, −20) to a point B (0, 0) when the G-code command in the second row is executed. The tool linearly interpolates from the point B (0, 0) to a point C (0, 35) when the G-code command in the third row is executed. The tool linearly interpolates from the point C (0, 35) to a point D (20, 35) when the G-code command in the fourth row is executed. The tool CCW circular interpolates with a 65-unit radius from the point D (20, 35) to a point E (25, 60) when the G-code command in the fifth row is executed. The tool CW circular interpolates with a 25-unit radius from the point E (25, 60) to a point F (65, 60) when the G-code command in the sixth row is executed. The tool CCW circular interpolates with a 65-unit radius from the point F (65, 60) to a point G (70, 35) when the G-code command in the seventh row is executed. The tool linearly interpolates from the point G (70, 35) to a point H (90, 35) when the G-code command in the eighth row is executed. The tool linearly interpolates from the point H (90, 35) to a point I (90, 0) when the G-code command in the ninth row is executed. The tool linearly interpolates from the point I (90, 0) to a point J (45, 10) when the G-code command in the tenth row is executed. The tool linearly interpolates from the point J (45, 10) to the point B (0, 0) when the G-code command in the eleventh row is executed. The tool linearly interpolates from the point B (0, 0) to the point A (−20, −20) when the G-code command in the twelfth row is executed.

In this embodiment, the G-code commands in the first row through the twelfth row are read by the interpreter to produce the corresponding executable instructions $I_{e1}$, $I_{e2}$, $I_{e3}$, . . . , $I_{e12}$. The upper controller 10 can send the executable instructions $I_{e1}$, $I_{e2}$, $I_{e3}$, . . . , $I_{e12}$ when the upper controller 10 does not send the stop command. Afterward, the executable instructions $I_{e1}$, $I_{e2}$, $I_{e3}$, . . . , $I_{e12}$ are sequentially sent to the queue buffer 204 and stored therein when the executable instructions $I_{e1}$, $I_{e2}$, $I_{e3}$, . . . , $I_{e12}$ are not sent completely and the servo driver 20 judges that the storage space of the queue buffer 204 is not full. It assumes that the upper controller 10 sends the preceding three executable instructions $I_{e1}$, $I_{e2}$, $I_{e3}$ to store in the queue buffer 204. Hence, the preceding three executable instructions $I_{e1}$, $I_{e2}$, $I_{e3}$ are sequentially stored in the queue buffer 204 in FIFO order. Namely, the first executable instruction $I_{e1}$, which is corresponding to the G-code command in the first row, is executed to rapidly move the tool to a point A (−20, −20). The second executable instruction Ie2, which is corresponding to the G-code command in the second row, is executed to linearly interpolate the tool from the point A (−20, −20) to a point B (0, 0). The third executable instruction Ie3, which is corresponding to the G-code command in the third row, is executed to linearly interpolate the tool from the point B (0, 0) to a point C (0, 35). Afterward, the preceding three executable instructions $I_{e1}$, $I_{e2}$, $I_{e3}$ are sequentially sent to the tool path calculator 206 when the preceding three executable instructions $I_{e1}$, $I_{e2}$, $I_{e3}$ are correctly received by the servo driver 20. Also, the preceding three executable instructions $I_{e1}$, $I_{e2}$, $I_{e3}$ are calculated by the tool path calculator 206 to produce a plurality of path points along the tool paths.

However, the servo driver 10 removes the incorrect executable instruction when at least one of the preceding three executable instructions $I_{e1}$, $I_{e2}$, $I_{e3}$ is incorrect. In this embodiment, it assumes that the received third executable instruction Ie3' is incorrect. The servo driver 10 removes the executable instruction Ie3' and requests the upper controller 10 to re-send the third executable instruction Ie3. In addition, the upper controller 10 stops sending the executable instructions $I_{e1}, I_{e2}, I_{e3}$ to the queue buffer 204 when the servo driver 20 judges that the storage space of the queue buffer 204 is full. The upper controller stops sending the executable instructions $I_{e1}, I_{e2}, I_{e3}, \ldots, I_{e12}$ when the upper controller 10 judges that the all executable instructions $I_{e1}, I_{e2}, I_{e3}, \ldots, I_{e12}$ are sent completely. In addition, the executable instructions are stopped sending to a queue buffer by the upper controller 10 when the upper controller sends the stop command. Namely, in case of emergency, the upper controller 10 provides an emergent request to stop sending the executable instructions $I_{e1}, I_{e2}, I_{e3}, \ldots, I_{e12}$ to the servo driver 20 to interrupt the operation of the servo driver 20.

Accordingly, the present invention provides the interpreter 102 of the upper controller 10 to read the G-code file and to interpret the G-code file to produce the executable instructions. Namely, it is different from the interpolation method which converts discrete position commands into smoothing position curves. Hence, the interpolation method produces a large amount of operation data to reduce the speed of the serial communication. In the embodiments of the present invention, only the executable instructions are sent to substantially reduce the large amount of operation data to increase the speed of the serial communication interface. Hence, the first high-speed serial communication interface 102 and the second high-speed serial communication interface 202 can be applied to multi-axis CNC tool machines to calculate tool paths.

In conclusion, the present invention has following advantages:

1. It substantially reduces the amount of the sent data from the upper controller to the servo driver. Therefore, it needs not raise the speed of the serial communication interface to process a large amount of the sent data.

2. The executable instructions can be calculated to produce a plurality of points along the tool paths without using a conventional command recovery, thus reducing path error.

3. The calculation of position, angular velocity, and angular acceleration of the tool paths are synchronous to the position commands between the servo driver and the upper controller to substantially increase dynamic response of the system.

4. Due to the low amount of the sent data, the upper controller can be requested to re-send the executable instructions to increase system robustness when the received executable instructions are not correct.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A tool-path calculation apparatus, which applied to a CNC tool machine to calculate tool paths according to a G-code file produced by a CAM software, the too-path calculation apparatus comprising:
   an upper controller comprising:
     an interpreter reading the G-code file and interpreting the G-code file to produce a plurality of executable instructions; and
     a first high-speed serial communication interface connecting to the interpreter to provide an interface for sending the executable instructions; and
   a servo driver comprising:
     a second high-speed serial communication interface connecting to the first high-speed serial communication interface of the upper controller to electrically connect between the servo driver and the upper controller to provide an interface for receiving the executable instructions;
     a queue buffer connected to the second high-speed serial communication interface to provide an store storage for storing the executable instructions which sent from the upper controller to the servo driver; and
     a tool path calculator connected to the queue buffer to receive and calculate the executable instructions to produce a plurality of path points along the tool paths.

2. The tool-path calculation apparatus in claim 1, wherein the G-code file is composed of a G01 command, a G02 command, a G03 command, and other basic G-code commands.

3. A method of calculating tool paths for a numerical controlled system, the numerical controlled system is applied to a CNC tool machine to calculate tool paths according to a plurality of executable instructions, and the method comprising the steps of:
   (a) reading a G-code file through an interpreter;
   (b) interpreting the G-code file through an interpreter to produce the executable instructions;
   (c) sending the executable instructions sequentially to a queue buffer to store the executable instructions;
   (d) sending the executable instructions sequentially to a tool path calculator from the queue buffer;
   (e) calculating the executable instructions into a plurality of path points along the tool paths through the tool path calculator.

4. The method in claim 3, wherein the step (c) further comprising:
   (c1) sending the executable instructions sequentially to the queue buffer when the upper controller does not send a stop command, the executable instructions are not sent completely, and the storage space of the queue buffer is not full.

5. The method in claim 3, wherein the step (c) further comprising:
   (c2) stopping sending the executable instructions to the queue buffer when the upper controller does not send the stop command, the executable instructions are not sent completely, and the storage space of the queue buffer is full.

6. The method in claim 3, wherein the step (c) further comprising:
   (c3) finishing sending the executable instructions to the queue buffer when the upper controller does not send the stop command and the executable instructions are sent completely.

7. The method in claim 3, wherein the step (c) further comprising:
   (c4) stopping sending the executable instructions to the queue buffer when the upper controller sends the stop command.

8. The method in claim 4, wherein the step (c1) further comprising:
   (c5) removing the incorrect received executable instructions and requesting the upper controller re-sending the executable instructions when the received executable instructions are not correct.

9. The method in claim 4, wherein the step (c1) further comprising:

(c6) re-executing the step (d) when the received executable instructions are all correct.

10. The method in claim 5, wherein the step (c2) further comprising:
(c7) re judging whether the upper controller sending the stop command.

11. The method in claim 5, wherein the step (c5) further comprising:
(c7) re judging whether the upper controller sending the stop command.

* * * * *